(12) United States Patent
Riley, Jr. et al.

(10) Patent No.: US 7,867,651 B2
(45) Date of Patent: Jan. 11, 2011

(54) LOW IMPEDANCE LAYERED BATTERY APPARATUS AND METHOD FOR MAKING THE SAME

(75) Inventors: Gilbert N. Riley, Jr., Marlborough, MA (US); James Ribordy, South Beloit, IL (US)

(73) Assignee: A123 Systems, Inc., Watertown, MA (US)

( * ) Notice: Subject to any disclaimer, the term of this patent is extended or adjusted under 35 U.S.C. 154(b) by 1592 days.

(21) Appl. No.: 11/117,157

(22) Filed: Apr. 28, 2005

(65) Prior Publication Data

US 2005/0277019 A1  Dec. 15, 2005

Related U.S. Application Data

(60) Provisional application No. 60/566,888, filed on Apr. 30, 2004.

(51) Int. Cl.
*H01M 2/26* (2006.01)
(52) U.S. Cl. .................................. 429/161; 429/175
(58) Field of Classification Search ............... 429/161, 429/175, 178, 211, 94
See application file for complete search history.

(56) References Cited

U.S. PATENT DOCUMENTS

| | | | |
|---|---|---|---|
| 4,332,867 A | | 6/1982 | Tsuda et al. |
| 6,232,012 B1 * | | 5/2001 | Howard et al. ............ 429/94 |
| 6,298,530 B1 | | 10/2001 | Barber et al. |
| 6,432,574 B1 | | 8/2002 | Suzuki et al. |
| 6,638,662 B2 * | | 10/2003 | Kaneda et al. ........... 429/231.8 |

FOREIGN PATENT DOCUMENTS

| | | |
|---|---|---|
| EP | 0771040 | 5/1997 |
| EP | 0969538 | 1/2000 |
| JP | 09 092250 | 4/1997 |

* cited by examiner

*Primary Examiner*—Jennifer Michener
*Assistant Examiner*—Monique M. Wills
(74) *Attorney, Agent, or Firm*—Wilmer Cutler Pickering Hale and Dorr LLP

(57) ABSTRACT

An electro-chemical storage device is described, and a method for making the same. In some aspects, a guidewire is co-wound with sheet or ribbon-like electrode materials so that contact is made between the guidewire and collector extensions of the electrode materials thereby forming an endcap with low impedance and high thermal sinking capabilities. In one embodiment, the storage device includes a negative electrode sheet have an edge which is substantially free of electrode active material, a positive electrode sheet have an edge which is substantially free of electrode active material, a first conductive guidewire disposed adjacent to the edge of the negative electrode sheet which is substantially free of electrode active material, and a second conductive guidewire disposed adjacent to the edge of the positive electrode sheet which is substantially free of electrode active material. The first conductive guidewire and the edge of the negative electrode sheet which is substantially free of electrode active material define a first electrode endcap and the second conductive guidewire and the edge of the positive electrode sheet which is substantially free of electrode active material define a second electrode endcap. The electrode endcaps are coupled to terminals of the storage device, which are capable of being connected to the terminals of an external circuit.

23 Claims, 11 Drawing Sheets

LOW IMPEDANCE LAYERED BATTERY APPARATUS AND METHOD FOR MAKING THE SAME

CROSS-REFERENCE TO RELATED APPLICATIONS

This patent application claims priority to U.S. Provisional Patent Application Ser. No. 60/566,888 filed Apr. 30, 2004.

TECHNICAL FIELD

The present disclosure relates to construction and use of electro-chemical storage units (batteries). In particular, the disclosure relates to a low-impedance battery apparatus and methods for making and using the same.

BACKGROUND

Devices for storing and providing electrical power have been in use for a long time. Generally falling under the descriptor "battery," such devices include electro-chemical cells and collections of cells that provide an electrical potential between at least a set of terminals. The terminals can be connected to an electrical (e.g. direct current, DC) load to energize or power the load. Batteries include dry cells, wet cells (e.g. lead-acid cells), and other types of units that generally convert a chemically available electromotive force into a current.

Batteries are sometimes classified into "primary" and "secondary" types. Primary batteries are single-use units that come from a manufacturer with a limited electrochemical capacity and are exhausted and discarded after use. Secondary batteries can be "recharged" after use, and while not infinite in their capacity, allow for repeated use of the same cell through reversing the discharge process to some extent.

To increase battery capacity, cells have been configured to take advantage of a large surface area between the anode (negative) and cathode (positive) elements of the cells. One such design involves placing many parallel plates in electrolyte solution to allow for ionic transfer between the anodes and cathodes. Another design separates planar layered sheets of anode and cathode materials with porous membranes, then rolls the layers into a roll, referred to as a "jelly roll" that provides a compact and mechanically stable battery. In rolled battery designs, multiple alternating sheets of anode, separator, and cathode materials are used as permitted by the spatial considerations of the battery, and the anode sheets are collectively connected to an anode terminal while the cathode sheets are collectively connected to a cathode terminal. The device may be rolled cylindrically or in other geometries, knows as prismatic configurations.

The entire device is packaged in a rigid enclosure, usually a cylindrical can. The anode and cathode materials and terminals are prevented from making electrical contact to avoid short-circuiting or discharging the battery except through the intended terminals through an electrical load connected thereto.

One problem encountered in traditional battery designs is that of the electrical impedance of the battery itself, which causes loss of electrical power and dissipation of heat internally within the battery. Another problem with present battery designs is that the ends of the cells are not well integrated into the anode and cathode terminals usually found at either end of a cylindrical battery design. Yet another deficiency of present battery designs is their inability to provide good thermal response and heat sink capabilities, especially in high-power applications. Additionally, present battery designs using collector sheets have not been successful in providing a way to connect a plurality of anode or cathode collectors together.

SUMMARY OF THE INVENTION

One aspect of the invention is directed to an electrochemical storage device, including a coiled battery assembly comprising negative and positive electrode sheets having a separator sheet disposed between the negative and positive electrode sheets, at least one of the positive and negative electrode sheets having an edge which is substantially free of electrode active material. A conductive guidewire is positioned along the edge that is substantially free of electrode active material, thereby forming an electrode endcap suitable for connection with an electrode terminal of the electrochemical storage device.

Another aspect of the invention is directed to a method of making an electrochemical storage device, including the steps of coaxially-winding a negative electrode sheet, a separator sheet and a positive electrode sheet to form a coiled battery assembly having a separator sheet disposed between the negative and positive electrode sheets wherein at least one of the positive and negative electrode sheets has an edge substantially free of electrode active material. A conductive guidewire is disposed alongside and substantially in contact with at least a portion of the edge that is substantially free of electrode active material. Once assembled, the guidewire and the edge that is substantially free of electrode active material form an electrode endcap that is suitable for connection with an electrode terminal of the electrochemical storage device.

Yet another aspect of the invention is directed to an electrochemical storage device, including an assembly comprising at least two electrically-complementary electrode sheets having a separator sheet disposed between the two electrically-complementary sheets, at least one of said electrode sheets having an edge substantially free of electrode active material and a conductive guidewire laid along the edge that is substantially free of electrode active material, thereby forming an endcap suitable for connection with an electrode terminal. The device can be assembled as a roll or as a stack or sandwich assembly.

Another aspect of the invention is directed to a battery pack, including at least one assembly comprising at least two electrically-complementary electrode sheets having a separator sheet disposed between said two electrically-complementary sheets, at least one of said electrode sheets having an edge substantially free of electrode active material. The assembly also including a conductive guidewire laid along the edge that is substantially free of electrode active material of the at least one electrode sheet and substantially contacting at least a portion of the edge, thereby forming an endcap suitable for connection with an electrode terminal.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements. The following drawings are for the purpose of illustration only and are not intended to be limiting of the invention, the scope of which is set forth in the claims that follow.

DETAILED DESCRIPTION OF THE INVENTION

The following describes in detail one or more embodiments suitable for arriving at the method and apparatus described herein, and should not be taken as exhaustive, inclusive, or limiting.

As mentioned previously, batteries have been formed by co-winding layers of active material (anode, cathode) and separating membrane layers in various geometries as called for by the application at hand. Some are rolled into cylindrical shapes, while others have rectangular or other shaped cross-sections, and are said to have "prismatic" configurations.

Figure 1:
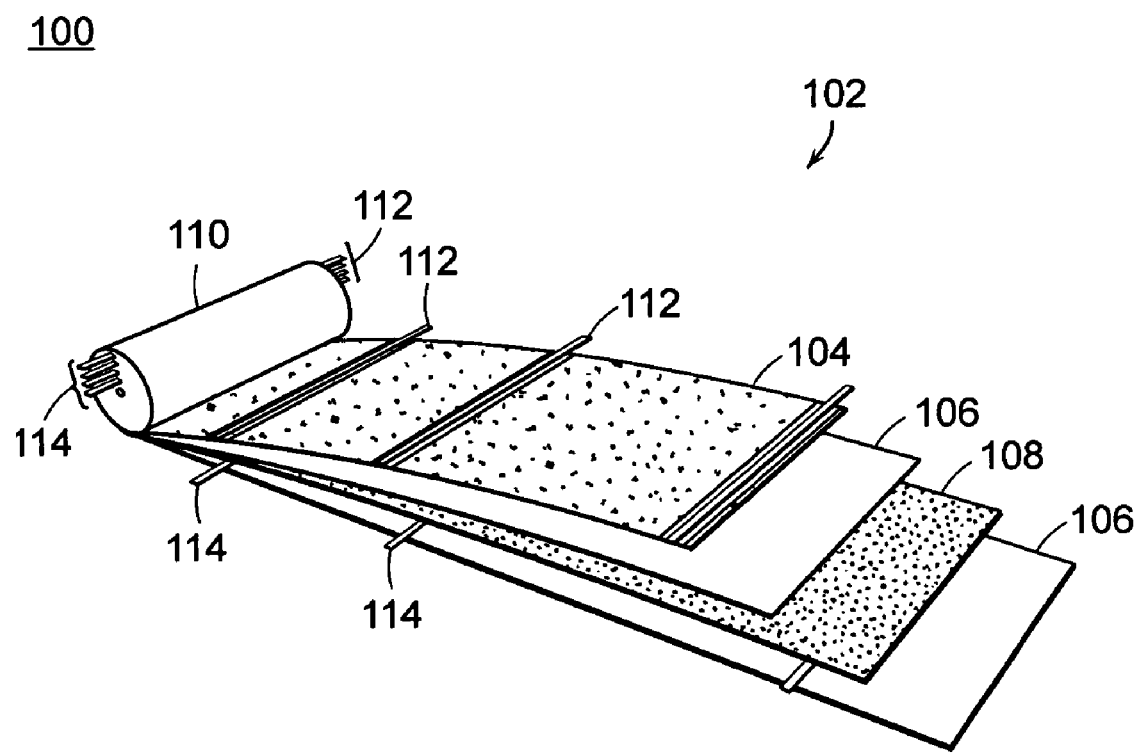
FIG. 1 illustrates a rolled electro-chemical storage device according to the prior art.

FIG. 1 shows part of a battery device 100 according to the prior art. Strips or sheets of anode 104 and cathode 108 are separated by separator membranes 106. The composition of anode 104 and cathode 108 depend on the specific type of battery, and include a layer of an electroactive material, e.g., graphite, metal, and other materials on an electrically conductive substrate. The substrate may serve as a current collector. In Li-ion batteries, $LiCoO_2$, $LiMn_2O_4$, $Li(Fe,Mn)PO_4$, or $(Li,Nb)(Fe,Mn)PO_4$ are typically the electroactive cathode material. The separator membranes 106 are porous and allow ions to be transported between the anode 104 and cathode 108, but are electrically insulating and serve to insulate the two electrodes from one another.

Device 100 is formed by co-winding ribbon-shaped materials 102 into a "jelly roll" 110. To provide electrical connections to the battery terminals, multiple conducting tabs 112, 114 are inserted by welding or other connections at carefully selected intervals within the structure before it is rolled up. A first set of tabs 112 are made to contact the anode material 104 and extend outward from the rolled portion 110 on one end thereof to form the anode terminal of the battery device. A second set of tabs 114 are made to contact the cathode material 108 and extend outward from the rolled portion 110 on another end thereof to form the cathode terminal of the battery device. The way in which the plurality of extended anode 112 and cathode 114 tabs or extensions are connected to each other and to other portions of the battery are a matter of design. Prior art designs of this aspect of rolled batteries have numerous shortcomings, some of which were discussed previously. These shortcomings include but are not limited to poor electrical properties (e.g. high impedance), poor thermal properties (poor heat dissipation), and poor mechanical and manufacturing properties.

Figure 2:
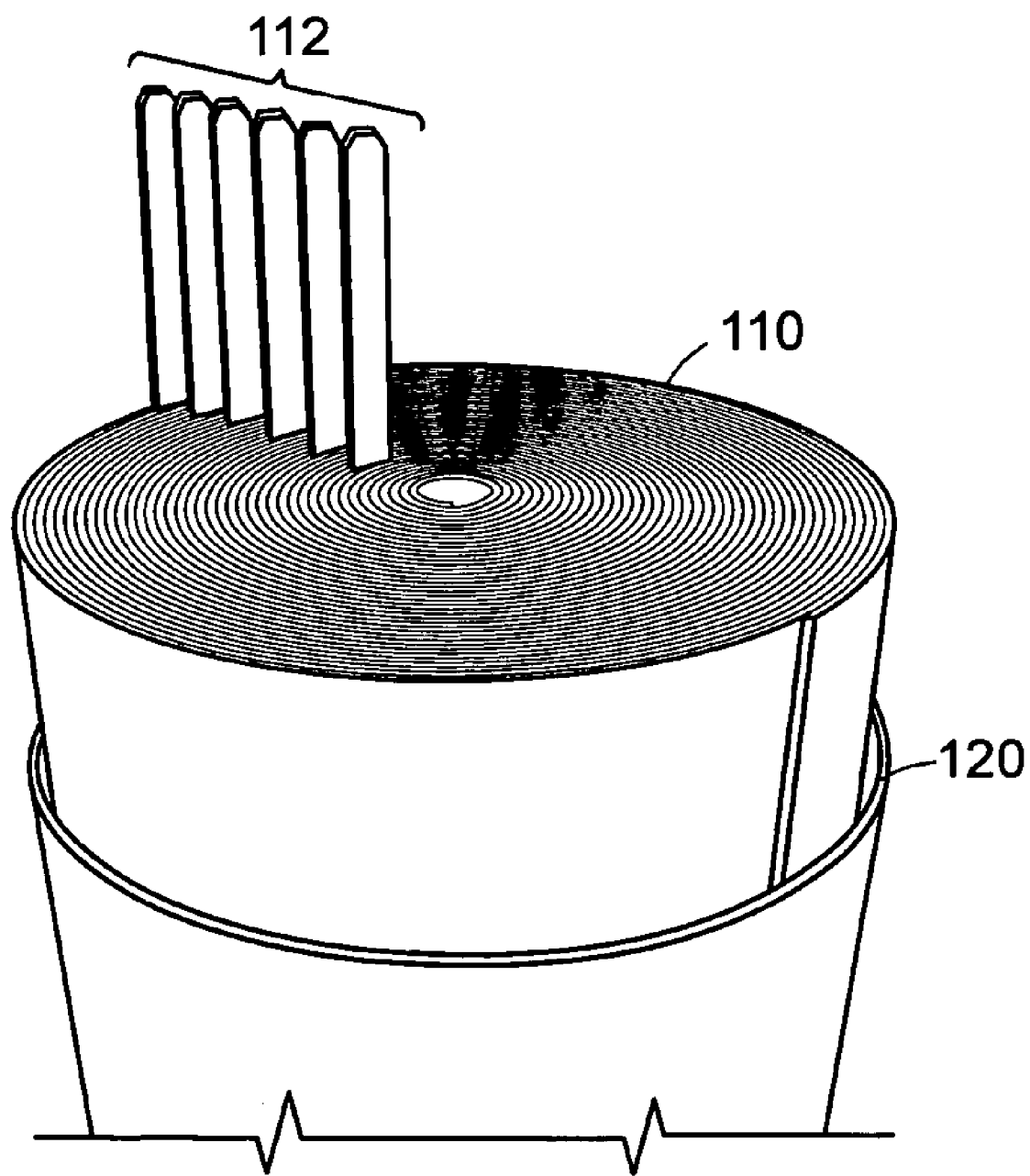
FIG. 2 illustrates one end of the rolled device of FIG. 1 with multiple tabs extending therefrom.

FIG. 2 illustrates an anode portion of a device according to the prior art, showing a group of collector tabs 112 extending from the rolled portion 110 of a battery device. A "can" 120 houses the entire jelly roll assembly and provides the assembly with mechanical protection, prevents contamination, acts as a heat sink, and provides a cathode terminal (not shown). Again, the prior art employed several methods to connect anode extensions 112, but a satisfactory method that provides good electrical, thermal, and mechanical properties has been lacking.

Figure 3:
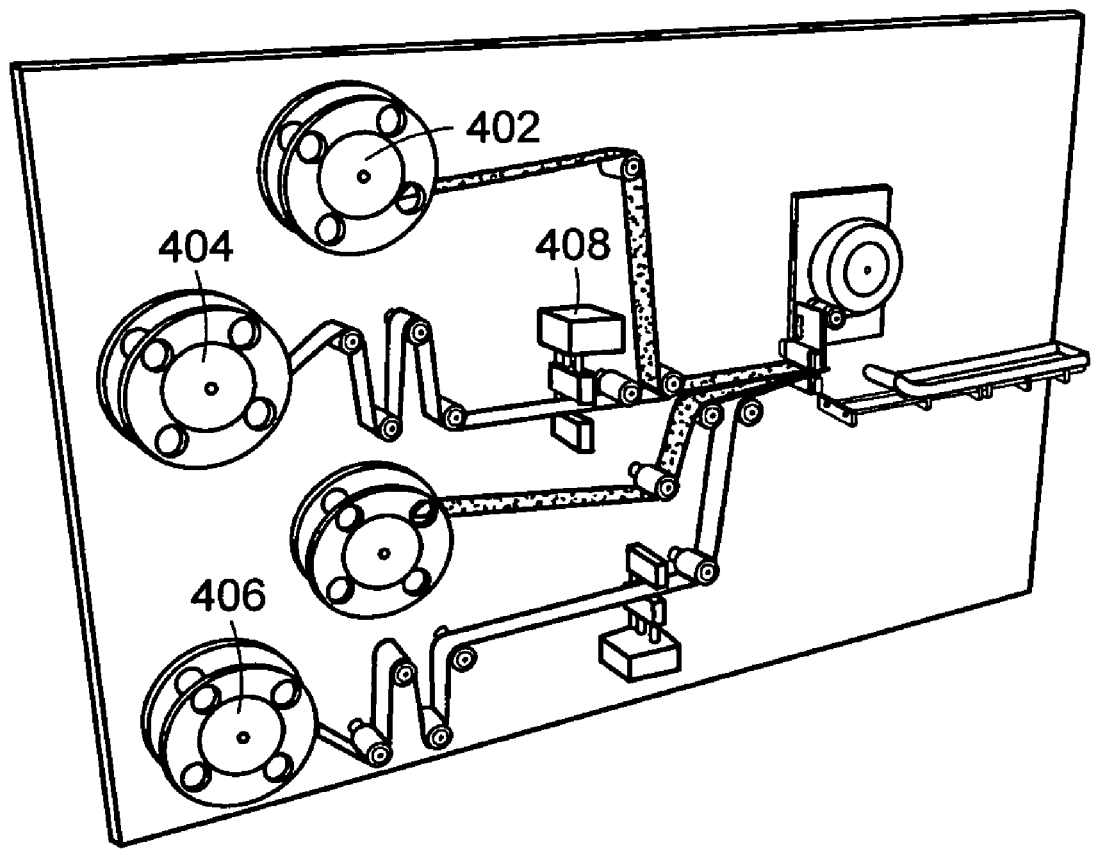
FIG. 3 illustrates a schematic representation of a way to co-wind the device of FIGS. 1 and 2 according to the prior art, showing tab insertion in the rolled device.

FIG. 3 illustrates one way to co-wind the ribbon-shaped materials to produce the structure of FIG. 1. Generally, rolls of each of the constituent materials are spooled at the appropriate feed rates and co-wound into the rolled battery structure described above. The anode, cathode, and separator materials may be provided from spools 404, 406, and 402, respectively. Anode and cathode tabs are inserted using apparatus 408 for example, which welds the tabs at the appropriate intervals into the wound assembly 110.

Figure 4:
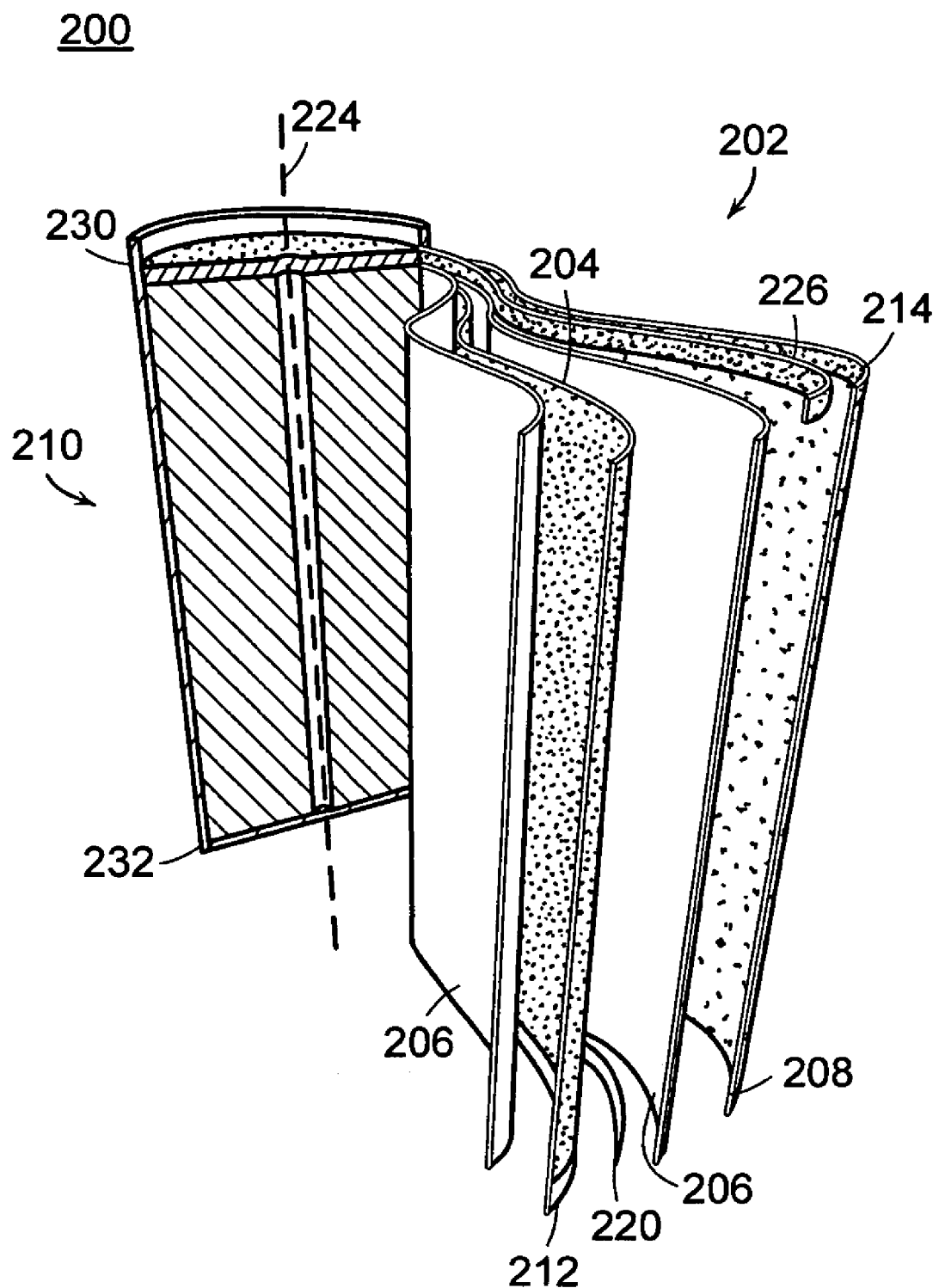
FIG. 4 illustrates a cutaway of a device according to an embodiment of the invention with various sheet electrodes, separators, and guidewires co-wound into a roll.

FIG. 4 illustrates an embodiment of a rolled battery apparatus 200 according to an embodiment of the present invention. The rolled portion 210 is shown cut away for illustrative purposes. The rolled portion 210 is formed of sheet or ribbon-shaped elements 202. Alternating sheets of cathodes 204 and anodes 208 are separated by separator membrane sheets 206. Apparatus 200 of FIG. 4 includes a single cathode 204 and a single anode 208. In other embodiments, however, the apparatus 200 may include several cathodes 204 and anodes 208. Anode 208 comprises a layer of electroactive material disposed on an electrically conductive substrate, e.g., a current collector. Materials that are conventionally used in forming an anode layer of a Li-ion battery may be used in the present design, for example. Each anode 208 includes an anode extension 214 that extends from the active portion of the anode 208. The anode extension 214 may be integral to or bonded or attached to the anode 208. The anode extension portion 214 is conductive and provides a way for electrical and thermal coupling to anode 208. Each cathode 204 also similarly includes a cathode extension 212 extending that extends from the active portion of the cathode 204. Cathode extension 212 may be integral to or bonded or attached to the cathode 204. Cathode 204 comprises a layer of electroactive material disposed on an electrically conductive substrate. Materials that are conventionally used in forming a cathode layer of a Li-ion battery may be used in the present design, for example. The anode extensions 214 and cathode extensions 212 are at opposite ends of the battery apparatus 200. Separator membranes 206 provide ion conductivity but prevent electronic conduction as discussed above.

At one end of the apparatus 200, a first conducting guidewire 226 is disposed adjacent to a portion of the conductive anode extension 214. The guidewire 226 is dimensioned such that the rolled structure 210 forms a substantially tight and compact anode interface surface 222 (i.e., anode endcap 222) comprised of the coiled guidewire 226 and the anode extension 214. A second conducting guidewire 220 is similarly disposed adjacent to a portion of the conductive cathode extension 212. When assembled, the guidewire 220 and the cathode extension 212 form a cathode interface surface 228, i.e., cathode endcap 228.

Figure 9:
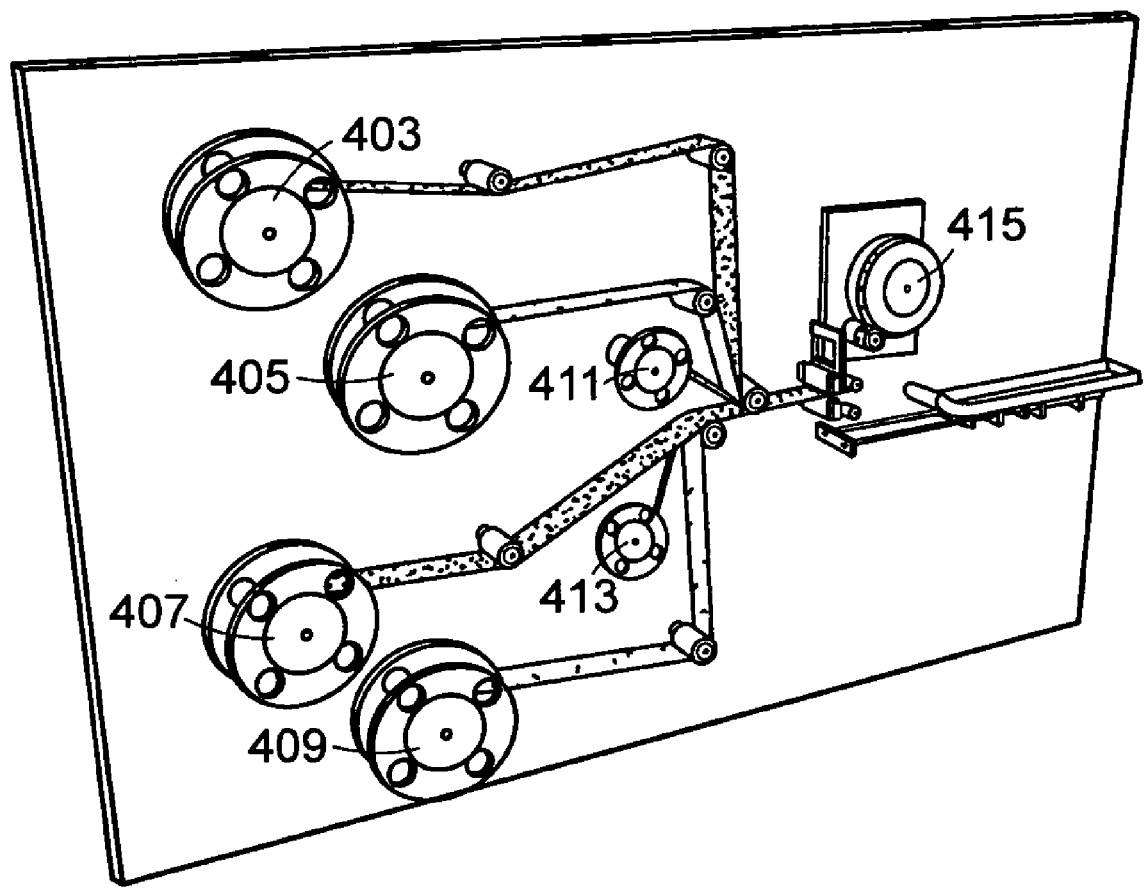
FIG. 9 illustrates a conceptual example of an apparatus and a method of assembling and making a rolled electrochemical storage device according to an embodiment of the invention.

The anode 208, cathode 204, and separator sheets 206, including the anode extensions 214, cathode extensions 212, and guidewires 220, 226, are wound together around central axis 224 to form the rolled structure 210. Any winding or stacking or layering method or design may be employed to construct the battery cell. An exemplary winding method and apparatus is depicted in FIG. 9, which is discussed in greater detail below. However, substantially flat (sandwiched) layers, or layers formed by accordion-style or folded or fan-like structural configurations can also be constructed in accordance with the teachings of the present disclosure. The rolled structure 210 of FIG. 4 is wound about the central axis 224. Therefore, each of the sheet-shaped materials forms a spiral (as viewed in the cross-section) about the same central axis 224.

Once wound into the roll, the anode extension 214 is secured to the first guidewire 226. For example, a laser weld line or seam is applied to mechanically, thermally and electrically couple the anode extension 214 and the first guidewire 226. The cathode extension is similarly processed. In one embodiment, the first guidewire 226 is selected of a material being the same as the material of which the anode extension 214 is made. Using guidewires and extensions comprised of the same material can provide good and stable properties and welding capabilities. The anode collector extensions 214 and the anode guidewire 226 may be made of aluminum, copper, titanium, carbon, or nickel, for example, while the cathode collector extensions 212 and the cathode guidewire 220 may be made of aluminum or other suitable material. The present invention, however, is not limited to this choice of materials, and other catalysts or helper layers and materials may also be used as desired to improve the thermal, electrical and electrical properties that exist between the extensions 212, 214 and guidewires 220, 226, respectively.

Additionally, the shape and dimensions of the guidewires 220, 226 are selected by design. For example, the guidewires 220, 226 may have a rectangular or other cross-section with a thickness sufficient to form endcaps in the rolled structure 210 so that the guidewire provides sufficient electro-mechanical contact with the surrounding cell element extensions. Additionally, the guidewires 220, 226 may be fluted, shaped, or notched in any suitable direction to have a profile allowing passage of fluid between some portions of the guidewires and the adjoining cell element extensions. In a particular embodiment, the guidewire 220, 226 includes grooves or notches cut therein, or a spiral groove going around its outer surface. The grooves or notches allow gases to escape the cell under some conditions of operation, also, the grooves or notches (not shown) allow for filling or pressing the electrolyte fluid into the body of the battery device.

The guidewires 220, 226 provide a low-impedance electrical connection between the terminal ends of the battery 200 and the external circuit to which it is to be connected.

Figure 5:
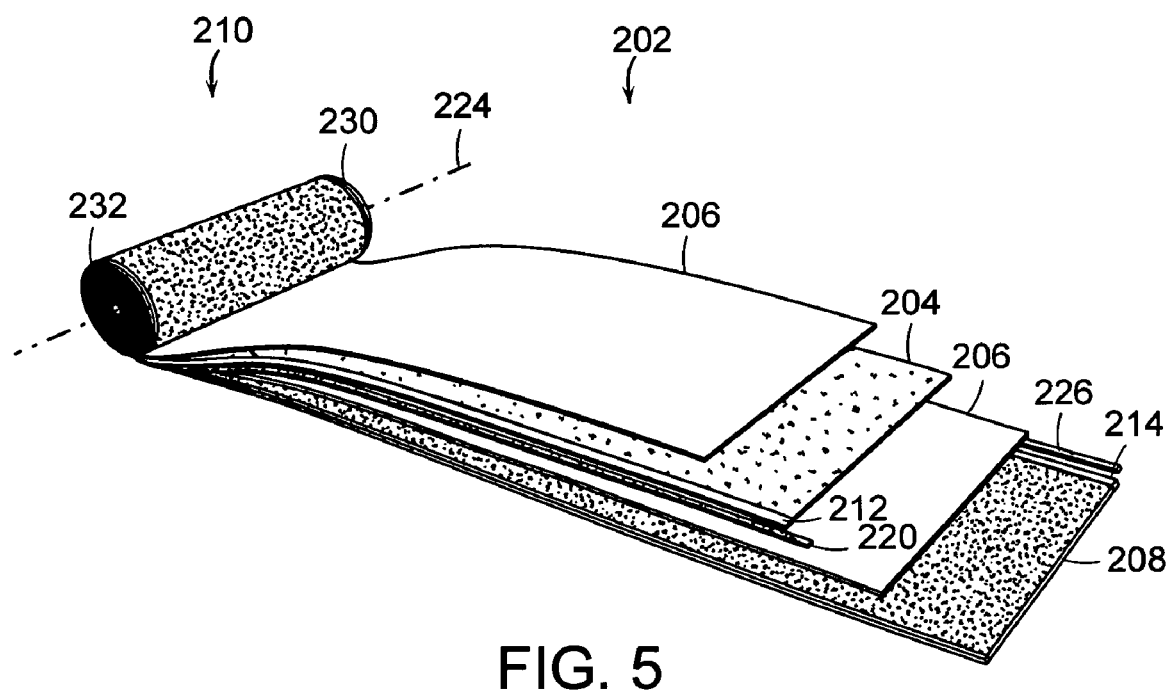
FIG. 5 is provides another illustrative view of a rolled electro-chemical storage device according to an embodiment of the present invention.

FIG. 5 illustrates another view of a portion of electrochemical storage (battery) device 200. The device is shown partially rolled 210 and partially unrolled 202 for clarity. Anode 208 has a conductive collector extension portion 214 extending therefrom as previously discussed, the extension 214 being substantially free of electrode active material and extending along the lower edge of the anode 208. The cathode 204 is similarly constructed (but of a different material than that of the anode 208) and has a conductive collector extension 214 extending along the upper edge of cathode 204. In some embodiments the edge of the anode 208 from which anode collector extension 214 protrudes and the edge of the cathode 204 from which the cathode collector extension 212 protrudes are on opposite ends of the battery device.

The sheet layers, including anode 208, cathode 204, and separator sheets 206 are co-wound about central axis 224. Anode guidewire 226 and anode extension 214 are co-wound with the other sheet materials to form anode conducting endcap 222 at end 230 of the rolled structure 210, while cathode guidewire 220 and cathode extension 212 are similarly co-wound with the other sheet materials to form cathode conducting endcap 228 at the opposite end 232 of the rolled structure 210.

Note that the notion of co-winding the sheet should be liberally construed. That is, one or more layers of sheet or sheet-like materials, as well as the guidewires 220 and 226 are wound together onto a spool or about one another to result in a spiral configuration of each material, within which the other materials are interspersed. The exact final outcome is not necessarily cylindrical in shape, and may have other prismatic cross-sectional configurations as well. Also, being coiled, rolled, or wound about axis 224 is not meant to imply that the layers form precise circular layers about axis 224. Other rolling or stacking structures are contemplated. In some embodiments the roll forms an increasing-radius spiral rather than constant-radius circular rings.

Figure 6:
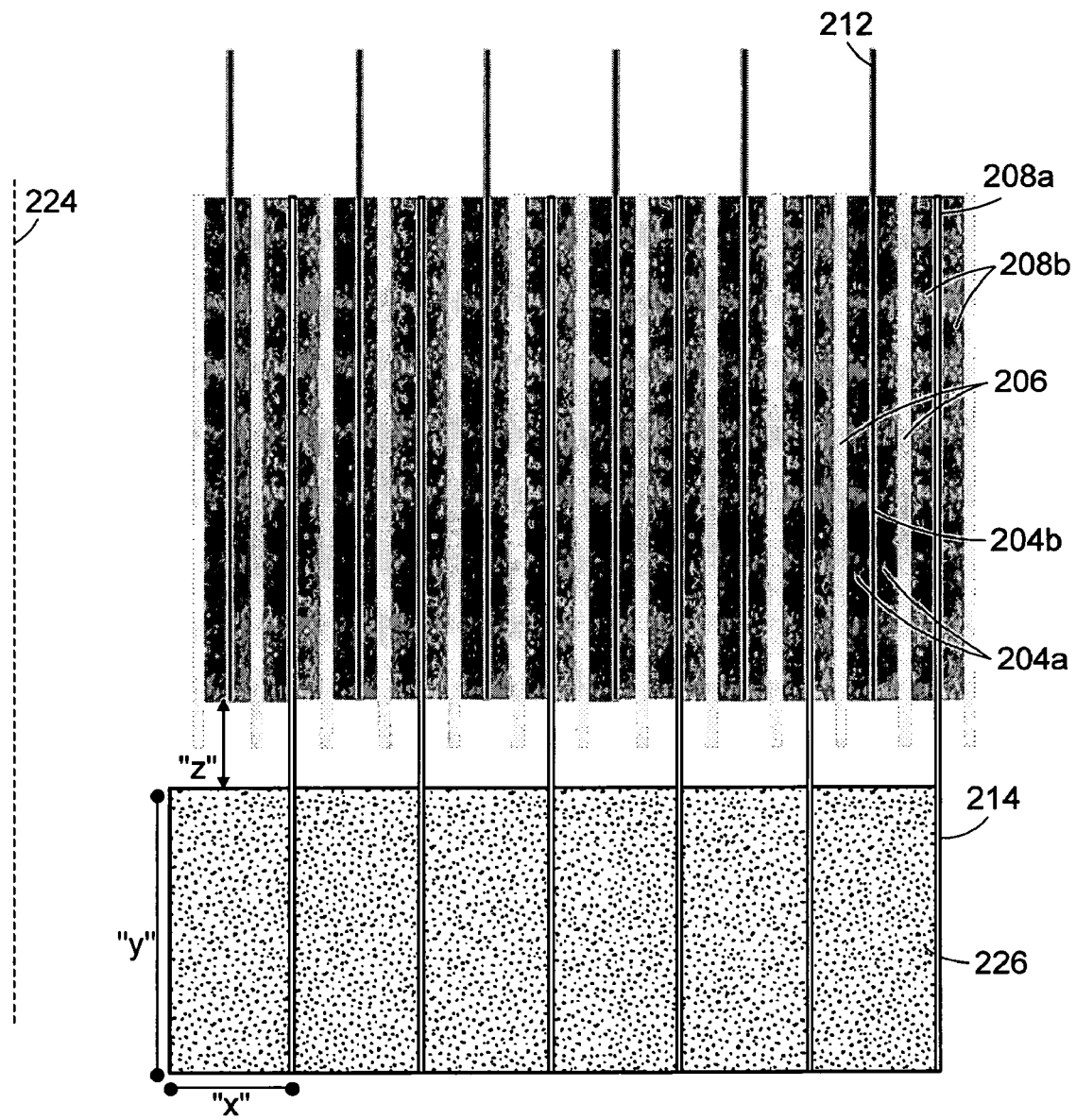
FIG. 6 illustrates a cross-sectional view of a portion of the anode end of a battery according to an embodiment of the present invention, showing the arrangement of the sheet materials and co-wound guidewire.

FIG. 6 is a portion of a cross-sectional view of a rolled electrochemical storage device (battery) that depicts the anode extension 214 and anode guidewire 226 constructed in accordance with the present invention. The cathode guidewire 220 and a portion of the cathode extension 212 have been omitted for clarity. FIG. 6 is provided for illustrative purposes only and is not drawn to scale. Referring to FIG. 6, graphite anode active materials 208$b$ surround a copper anode collector 208$a$. The active anode material 208$b$ and the anode substrate 208$a$ are collectively referred to as the anode 208. The anode extension 214 is coupled to (or integral with) the anode substrate 208$a$ and extends beyond the coated active anode material 208$b$. The anode extension 214 extends beyond the coated active anode element 204 by a distance sufficient to allow for installation of guidewire 226 between successive windings of collector extension 214 and without having electrical contact between the guidewire 226 and the other layers of active material electrodes or separator sheet sheets 206. In the figure, a height distance of "z" is provided between the guidewire 226 and the other sheet materials.

The guidewire 226 is made of copper, and has a rectangular cross-section with dimensions "x" and "y." The dimensions "x" and "y" depend on several factors, but in one or more embodiments "x" is approximately 300 micrometers and "y" is approximately 1.5 mm. In some embodiments, it is desired to minimize dimension "y", minimize dimension "z", or both.

As mentioned earlier, it is typically useful to have the thickness of guidewire 226 (dimension "x") be approximately equal to the distance between successive windings of anode copper collector extension 214. In this way, both electrical and mechanical contact is made between the collector extensions 214 and the guidewire 226. In some embodiments, it is desirable to minimize the dimension "y" to enhance the overall volume of electrode within the cell. Alternatively, dimension "y" is large enough to provide mechanical stability during high speed winding, and to prevent damage to the jelly roll during the operation in which the guidewire 226 is joined to the current collector extensions 214. In embodiments calling for enhanced thermal protection, dimension "y" may be increased to increase the heat capacity product to satisfy the desired heat content needs to protect the cell from overheating.

Cathode active materials 204b surround an aluminum cathode collector 204a. The active cathode material 204b and the cathode substrate 204a are collectively referred to herein as the cathode 204. The cathode extension 212, which is comprised of aluminum, is coupled to (or integral with) the cathode substrate 204a and extends beyond the coated active cathode material 204b. The cathode extension 212 extends beyond the coated active cathode material 204b by a distance sufficient to allow for installation of guidewire 220 between successive windings of collector extension 212 and without having electrical contact between the guidewire 220 and the other layers of active material electrodes or separator sheet sheets 206. Although not depicted in FIG. 6, guidewire 220 is constructed and arranged relative to the cathode extension 212 and cathode 204 in a similar manner as previously discussed in regards to guidewire 226. Guidewire 220 is made of aluminum, the same material that is used to form the cathode extension 212.

To help establish desirable electrical, thermal and mechanical connection between the electrode collector extensions 212, 214 and the guidewires 220, 226, respectively, weld joints are provided across successive portions of the cathode extension 212 and guidewire 220 to form the cathode endcap 228 and other weld joints are similarly applied across successive portions of the anode extension 214 and guidewire 226 to form the anode endcap 222.

Figure 7:
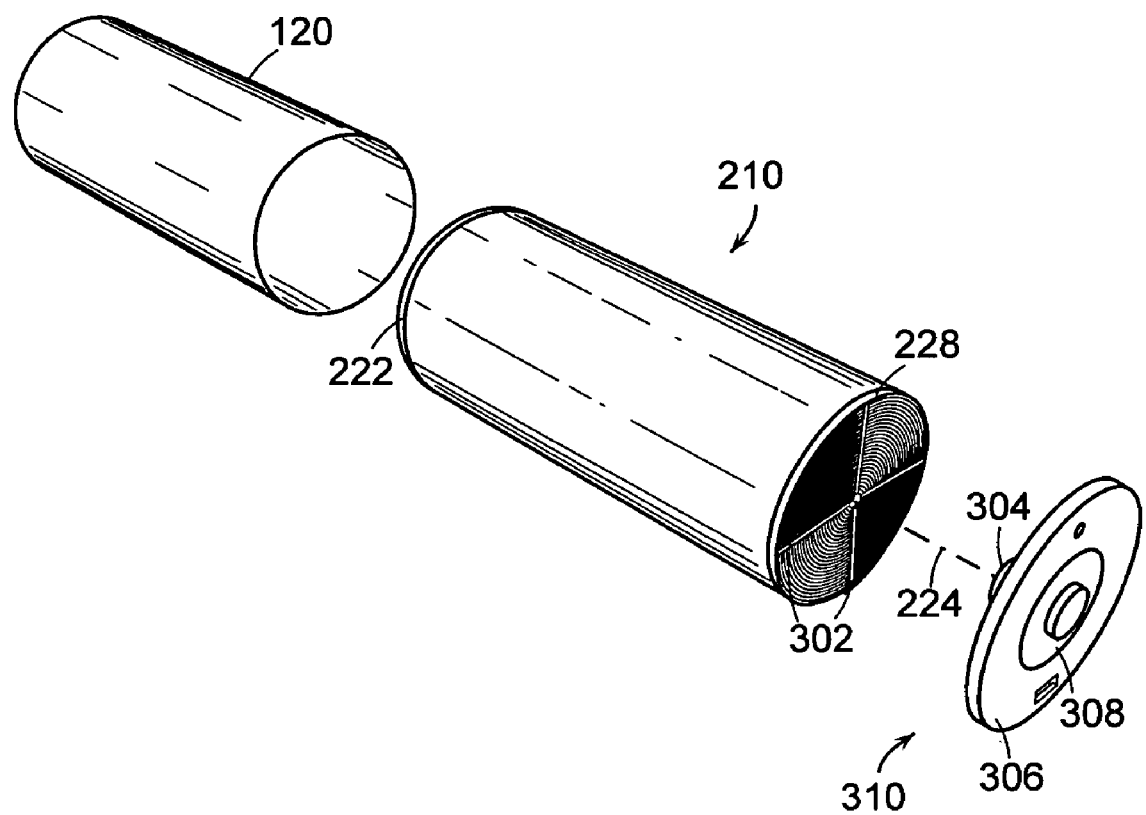
FIG. 7 illustrates an exploded view of a battery device according to an embodiment of the present invention, showing an endcap and welds holding the endcap parts together, as well as a can and a cover apparatus.

FIG. 7 illustrates how welds are provided to structurally maintain the cathode endcap 228 of a rolled battery apparatus 200. After the cathode endcap 228 has been formed by rolling the elements 202 as previously discussed, two radial welds 302 that define equally spaced quadrants of the endcap 228 are applied across successive portions of cathode extension 212 and guidewire 220 (not shown individually). While FIG. 7 only illustrates two welds 302 being used to form endcap 228, any number of welds might be appropriately used to properly secure the endcap 228. Anode endcap 222 is to be secure through the use of similar welds 302 (not shown).

After the welds 302 have been applied, cathode endcap 228 is then coupled to a cover 310. Cover 310 has a conductive center terminal 304 that is used to connect the battery to an external electrical circuit. The conductive center terminal 304 is preferably comprised of the same material that is used to form the guidewire of the electrode endcap which is be coupled to it, e.g., guidewire 220 of cathode endcap 228. The cover 310 further includes an insulating ring 308 disposed around the center terminal 304 and an outer conducting ring 306. Once assembled, an electrically conductive pathway exists between the cathode endcap 228 of the rolled assembly 210 and the center terminal 304 of the cover 310. The rolled assembly 210 is then inserted into the conductive can 120 and the anode endcap 222 is coupled to the metal can 120 by welding a portion of the anode endcap 22 to the inside end of the can 120, for example. The cover 310 is then attached to the can 120, by welding, for example. Electrolyte can be introduced into the interior volume that is defined by the can 120 and the cover 310 via a port (not shown) once the cover 310 has been attached to the can 120. The port is plugged after the volume has been sufficiently filled. The port can be provided in the cover 310 or, alternatively, in the can 120. Alternatively, the electrolyte can be introduced into the interior volume of the can 120 prior to attaching the cover 310. After assembly, an electrically conductive pathway thus exists between the anode endcap 222 of the rolled assembly 210 and the can 120. The cathode endcap 228, in contrast, is electrically isolated from the can 120. The construction of the can 120, cover 310, and other details will depend on the application for which the battery is being designed.

Figure 8:
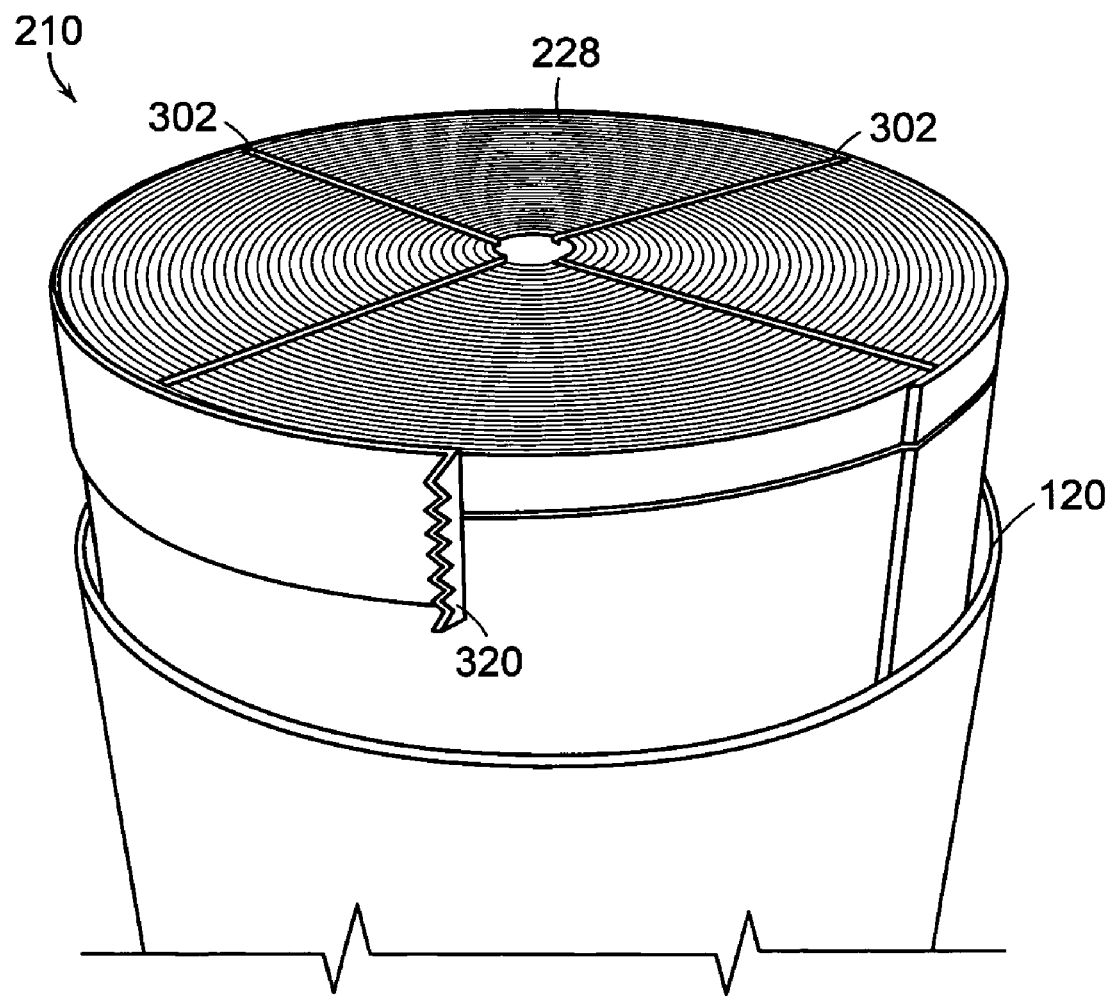
FIG. 8 illustrates an endcap and welds made therein, as well as insulating tape and the way of inserting the rolled device into a can.

In some embodiments, as shown in FIG. 8, insulating tape 320 is used to further ensure that the cathode endcap 228 is electrically isolated from the metal can 120. FIG. 8 also shows the final appearance of the endcap 228, including the spirally co-wound layers of cathode collector extension 212 and guidewire 220 being attached by weld joints 302 made in the face of the endcap 228.

It should be appreciated that the weld joints 302 can be made by any suitable method that fits the application at hand. For example, laser welds, spot welds, ultrasonic welds, or other types of attachment can be used. Also, it should be appreciated that the weld joints 302 do not necessarily extend all the way across the face of the endcap 228, but can be multiple discrete welds that accomplish substantially the same effect, such as smaller welds that are staggered across the radial span of the endcap 228.

FIG. 9 illustrates an exemplary apparatus and method for making a rolled battery device as described herein. Spools 403 and 407 hold separator membrane sheet material 206. Spool 405 holds anode electrode sheet material 208, and spool 409 holds cathode electrode sheet material 204. Spool 411 holds guidewire 226 and spool 413 holds cathode guidewire 220.

The sheet and guidewire materials are co-wound onto spool 415, and other processing apparatus and steps may be added as necessary to complete the manufacture of rolled portion 210 of a battery.

Once the roll 210 is formed, its endcaps 222 and 228 are welded as discussed above and the rolled structure 210 is inserted into a metal can, such as aluminum can 120. The endcaps 222 and 228 may be further welded or suitably attached to the can 120 or a cover 310. If an aluminum can is used for Li-ion chemistry, the cathode endcap 228 can be attached to the can 120 with the anode endcap 222 being attached the center terminal 304 of the cover 310. If a steel can is used, however, the anode endcap 222 can alternatively be coupled to the can and the cathode endcap 228 is coupled to the terminal of the cover.

Electrolytic filler fluids and gels may be inserted into the battery roll once formed by known techniques, such as vacuum back-filling. One way in which the battery roll 210 may be so filled also allows for gas exchange during charging and discharging of the battery. This is possible by making the guidewires or the collector extensions have grooves or notches built therein to prevent airtight seals from being formed, and to allow for passage of fluids and gases through the grooves and notches.

To provide additional electrical, thermal, and mechanical utility, flexible conducting elements may be inserted between the endcaps 222, 228 and respective outer battery casing elements, such as can 120 and cover 310. For example, spring-loaded separators that are welded or pressure-fitted in place can be used. In some instances, a wavy-washer type apparatus can serve to provide the needed coupling between the endcaps and the external battery casing components. In other cases, a wide conductive and flexible strap can be welded to the endcap and the battery can or terminal and bent upon itself thereby providing electrical connector and spring (dynamic force) functionality.

While traditional battery designs currently struggle to provide high power applications with the desired results, the embodiments described herein allow for a reduced impedance design that provide improved electrical characteristics for high power and high current applications. Lower resistance of the battery cell internals and endcaps also reduces heat generation and dissipation from the battery. The endcaps described and their method of attachment to the collector extensions provide good heat sink to the outer battery components and prevent undesired thermal buildup in the battery.

In a Li-ion cell with a LiFePO4 graphite chemistry formulated for high power, electrodes are fabricated using conventional processes to coat both sides of a current collector with electroactive material. In one or more embodiments, the thickness of the two-sided cathode and anode are 200 and 100 microns, respectively. The thickness of the anode and cathode current collectors are about 12 microns. The thickness of the separator is about 25 microns. Guidewires of aluminum and copper with dimensions of about 0.16 by 0.32 mm (cross section) are wound concentrically into a rolled battery configuration, such as a "18650" configuration.

The length of the cathode and anode is about 55 and 61 cm, respectively. Laser welding is used to join the guidewires to the anode and cathode extended current collectors. Copper and aluminum strap (8 mm by 0.1 mm by 2.0 cm) are used to join the jelly roll to a steel can and header, respectively. After activating the cell, the 1000 Hz impedance of an 18650-based configuration was about 10.5 milliohm. The cell exhibited low self-heating when pulsed at high current or continuous high current discharge. This impedance is related to the length of the electrodes used in the cell and the 1000 Hz impedance of a "26650" configuration cell with similar construction was about 8.5 milliohm.

Figure 10:
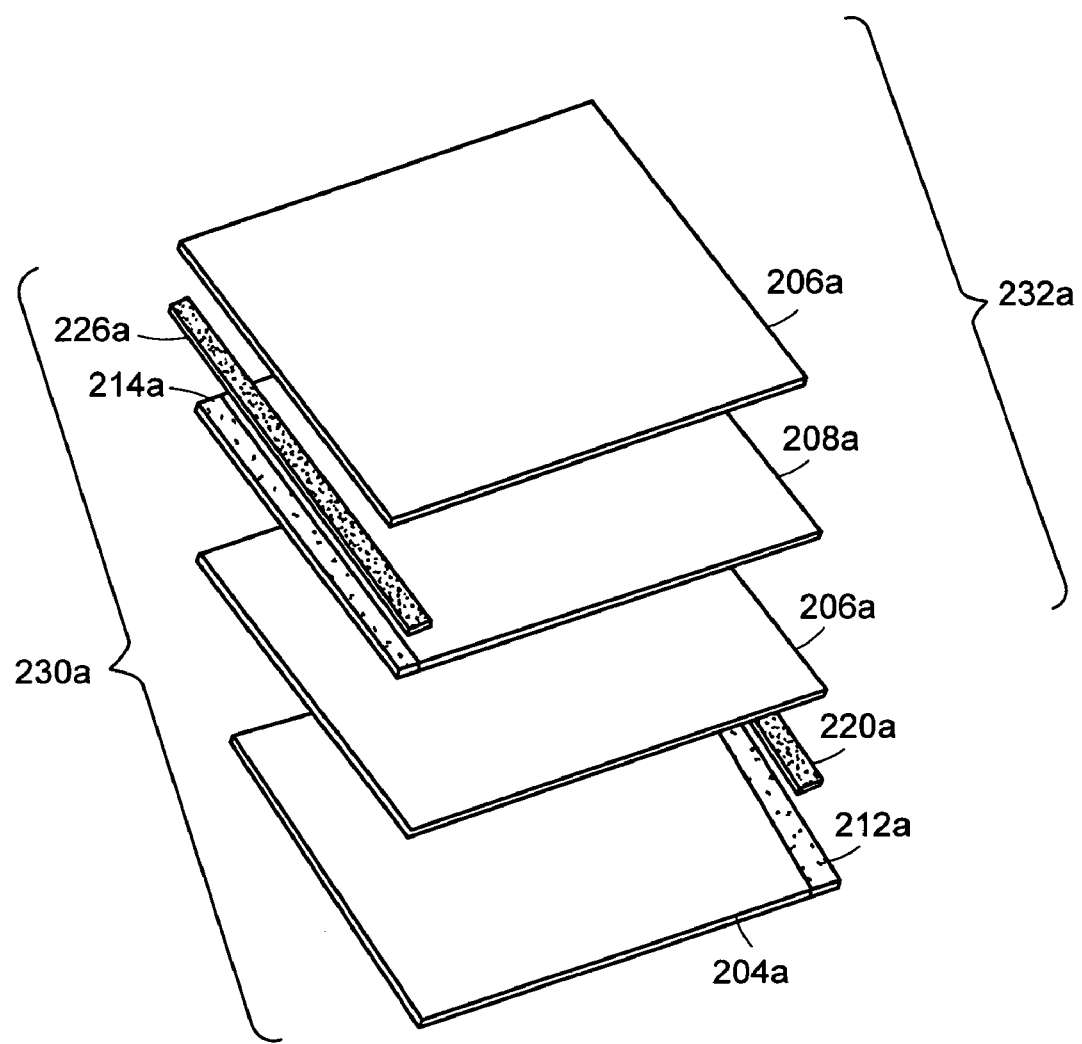
FIG. 10 illustrates a substantially-flat based stacked or sandwich type device.

FIG. 10 illustrates a stacked embodiment of an electrochemical storage device constructed in accordance with the present invention. Two separator sheets 206a are placed between electrodes 204a and 208a. Guidewires 220a and 226a are placed adjacent to the extensions 212a and 214a respectively. The final product contains relatively flat-stacked sheets of separator and electrode material, and the guidewires are also straight to conform to the straight profiles of the flat-stacked sheets.

Figure 11:
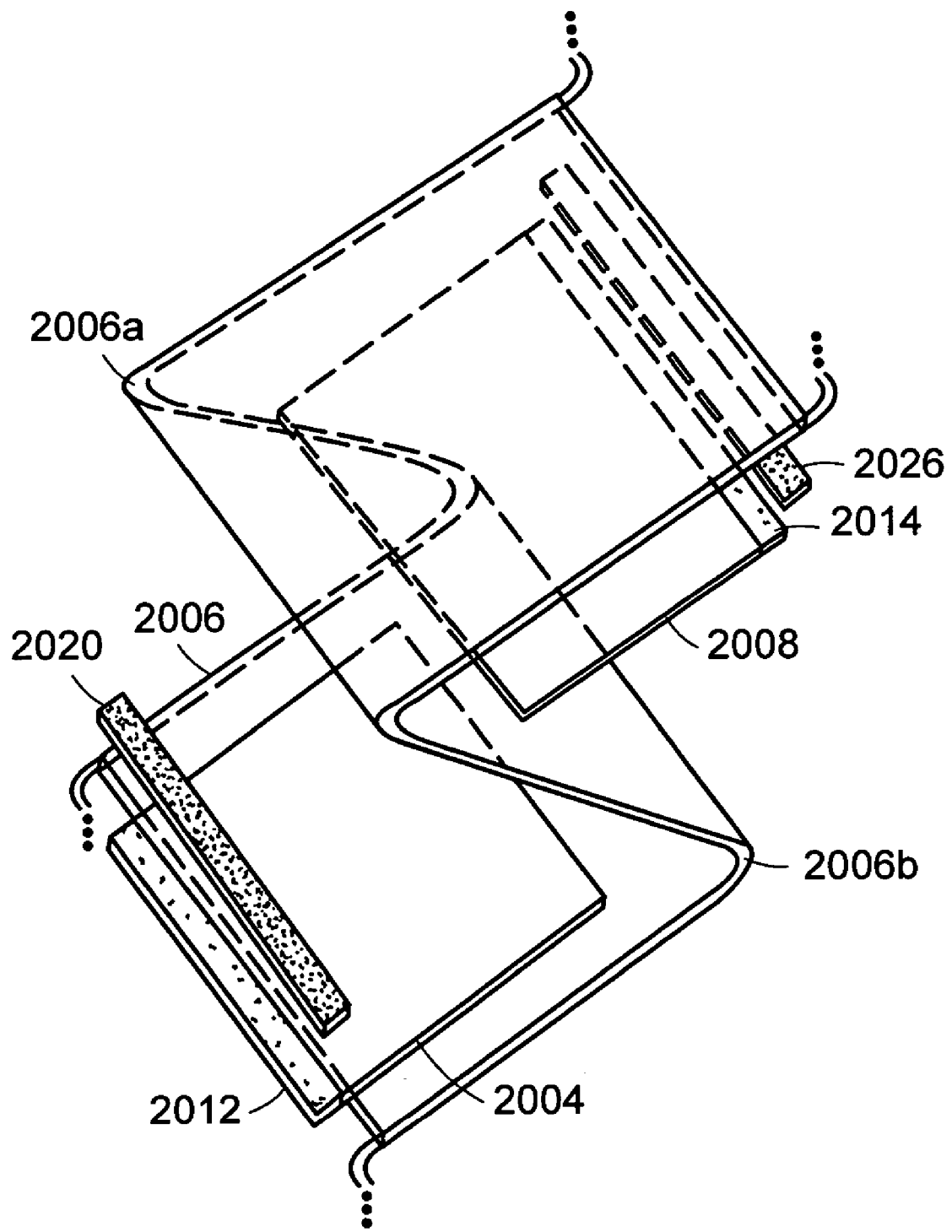
FIG. 11 illustrates a folded or accordion style separator portion of a stacked device.

FIG. 11 illustrates yet another embodiment of the present invention whereby the separator sheet 2006 is folded in an accordion-style, including along folds 2006a and 2006b. The other sheets of electrode material 2004 and 2008 and placed in opposing sides of the formation made by the folded separator 2006. End caps and terminal connections are then added to the assembly to form a battery device. This configuration, like the stacked configuration of FIG. 10 can be extended (not shown) to include many layers as needed by the design at hand.

Upon review of the present description and embodiments, those skilled in the art will recognize useful modifications and equivalent substitutions of various aspects of the present disclosure without departing from the scope of the invention. Thus, the scoped of the invention is not limited to the specific embodiments that are discussed above.

What is claimed is:

1. An electrochemical storage device, comprising:
   a coiled assembly comprising a negative electrode sheet, a positive electrode sheet and a separator sheet disposed between the negative and positive electrode sheets, at least one of the positive and negative electrode sheets having an edge which is substantially free of electrode active material; and
   a conductive guidewire disposed adjacent to an edge of an electrode sheet which is substantially free of electrode active material, wherein the conductive guidewire and the edge which is substantially free of electrode active material are wound to form an electrode endcap.

2. The device of claim 1, wherein the thickness of the guidewire is substantially equal to the radial spacing which exists between adjacent portions of the edge of the electrode sheet which is substantially free of electrode active material.

3. The device of claim 1, wherein a physical dimension of the guidewire is selected to provide a selected thermal heat capacity.

4. The device of claim 1, wherein one of the electrode sheets comprise a current collector sheet having layers of active material disposed on portions of opposing surfaces of the current collector sheet.

5. The device of claim 1, wherein,
   the negative electrode sheet has an edge which is substantially free of electrode active material;
   the positive electrode sheet has an edge which is substantially free of electrode active material;
   the guidewire is in the form of a first conductive guidewire disposed adjacent to the edge of the negative electrode sheet which is substantially free of electrode active material, wherein the first conductive guidewire and the edge of the negative electrode sheet which is substantially free of electrode active material define the electrode endcap as a first electrode endcap; and
   a second conductive guidewire is disposed adjacent to the edge of the positive electrode sheet which is substantially free of electrode active material, wherein the second conductive guidewire and the edge of the positive electrode sheet which is substantially free of electrode active material define a second electrode endcap.

6. The device of claim 5, wherein the first electrode endcap and the second electrode endcap are disposed on opposite ends of the coiled assembly.

7. The device of claim 5, wherein the first electrode endcap defines a cathode endcap and the second electrode endcap defines an anode endcap.

8. The device of claim 7, further comprising:
   a housing and a cover, the housing having a conductive portion and the cover having a conductive terminal; and
   wherein the cathode endcap is electrically coupled to the conductive terminal of the cover and the anode endcap is electrically coupled to the conductive portion of the housing.

9. The device of claim 8, further comprising a flexible conductive member that electrically couples the cathode endcap to the cover.

10. The device of claim 7, further comprising:
    a housing and a cover, the housing having a conductive portion and the cover having a conductive terminal; and
    wherein the anode endcap is electrically coupled to the conductive terminal of the cover and the cathode endcap is electrically coupled to the conductive portion of the housing.

11. The device of claim 10, further comprising a flexible conductive member that electrically couples the anode endcap to the cover.

12. The device of claim 5, wherein the negative electrode sheet and the first conductive guidewire are both comprised of aluminum and the positive electrode sheet and the second conductive guidewire are both comprised of copper.

13. The device of claim 1, further comprising a weld disposed on a portion of a face of the electrode endcap.

14. The device of claim 13, wherein the weld is formed via laser welding.

15. The device of claim 13, wherein the weld forms an electrical connection through successive windings of the conductive guidewire and the edge of the electrode sheet that define the electrode endcap.

16. The device of claim 13, wherein the weld is disposed radially on the face of the electrode endcap.

17. The device of claim 1, wherein the negative electrode sheet, positive electrode sheet, separator sheet and conductive guidewire are wound around a common axis to form substantially concentric windings having substantially cylindrical profiles.

18. The device of claim 1, wherein the negative electrode sheet, positive electrode sheet, separator sheet and conductive guidewire are wound around a common axis to form substantially concentric windings having substantially prismatic profiles.

19. The device of claim 1, wherein the electrode endcap further includes fluid passageways.

20. A battery pack device, comprising:
at least one assembly comprising at least two electrically-complementary electrode sheets having a separator sheet disposed between the two electrically-complementary sheets, wherein at least one of the electrode sheets has an edge substantially free of electrode active material; and
the at least one assembly also comprising a conductive guidewire disposed adjacent to an edge of an electrode sheet which is substantially free of electrode active material, wherein the conductive guidewire and the edge which is substantially free of electrode active material are wound to form an endcap for connection with an electrode terminal.

21. The device of claim 20, wherein a first assembly and a second assembly are electrically connected in series.

22. The device of claim 20, wherein a first assembly and a second assembly are electrically connected in parallel.

23. The device of claim 20, wherein the thickness of the guidewire is substantially equal to the radial spacing which exists between adjacent portions of the edge of the electrode sheet which is substantially free of electrode active material.

* * * * *